United States Patent
Ku

(10) Patent No.: US 10,528,194 B2
(45) Date of Patent: Jan. 7, 2020

(54) TOUCH SCREEN PANEL AND DRIVING METHOD OF THE SAME

(71) Applicant: Samsung Display Co., Ltd., Yongin-si, Gyeonggi-do (KR)

(72) Inventor: Ja Seung Ku, Yongin-si (KR)

(73) Assignee: Samsung Display Co., Ltd. (KR)

( * ) Notice: Subject to any disclaimer, the term of this patent is extended or adjusted under 35 U.S.C. 154(b) by 574 days.

(21) Appl. No.: 15/090,044

(22) Filed: Apr. 4, 2016

(65) Prior Publication Data

US 2017/0068350 A1    Mar. 9, 2017

(30) Foreign Application Priority Data

Sep. 9, 2015  (KR) .................. 10-2015-0127862

(51) Int. Cl.
*G06F 3/044*   (2006.01)
*G06F 3/041*   (2006.01)

(52) U.S. Cl.
CPC ............ *G06F 3/044* (2013.01); *G06F 3/0418* (2013.01)

(58) Field of Classification Search
CPC ............................... G06F 3/0418; G06F 3/044
See application file for complete search history.

(56) References Cited

U.S. PATENT DOCUMENTS

| | | | | |
|---|---|---|---|---|
| 2011/0063993 | A1* | 3/2011 | Wilson | G06F 3/044 370/254 |
| 2011/0115729 | A1* | 5/2011 | Kremin | G06F 3/0418 345/173 |
| 2012/0182235 | A1* | 7/2012 | Lee | G06F 3/041 345/173 |
| 2013/0154991 | A1 | 6/2013 | Yilmaz | |
| 2015/0084923 | A1* | 3/2015 | Kang | G06F 3/0418 345/174 |

* cited by examiner

*Primary Examiner* — Mark Edwards
(74) *Attorney, Agent, or Firm* — Innovation Counsel LLP

(57) ABSTRACT

The touch screen panel may include: a touch sensor that outputs sensing data through n output channels ("n" is a natural number equal to or larger than 2); a noise measuring unit that calculates a noise value of an m-th output channel ("m" is a natural number smaller than "n") and a noise value of an m+1-th output channel by using the sensing data outputted from the touch sensor during a predetermined period; and a noise eliminating unit that produces noise eliminated data of the m+1-th output channel by using sensing data of the m-th output channel, sensing data of the m+1-th output channel, the noise value of the m-th output channel, and the noise value of the m+1-th output channel.

14 Claims, 5 Drawing Sheets

TOUCH SCREEN PANEL AND DRIVING METHOD OF THE SAME

CROSS-REFERENCE TO RELATED APPLICATION

This application claims priority to and the benefit of Korean Patent Application No. 10-2015-0127862, filed on Sep. 9, 2015, in the Korean Intellectual Property Office, the entire contents of which are incorporated herein by reference in their entirety.

BACKGROUND (a) Field

The present inventive concept relates to a touch screen panel and a driving method of the same.

(b) Description of the Related Art

A touch screen panel is an input device in which a user's command is inputted by selecting instructions shown in a screen of an image display device with a special object and/or one or more fingers.

For this function, the touch screen panel is provided on a front surface of the image display device, and converts a touch input by the object or the finger to an electrical signal. The electrical signal generated by the touch input are thus accepted as an input signal.

Since such a touch screen panel may replace a separate input device such as a keyboard, a mouse, etc., its usage range tends to be gradually extended.

As a type of implementing the touch screen panel, a resistive type, a photo-sensitive type, a capacitive type, and the like have been known.

Among them, the capacitive type senses a variation in capacitance generated by a conductive sensing electrode together with other neighboring sensing electrodes when the finger or the object touches the screen, and then converts the touch input into the electric signal.

However, efficiency of the capacitive touch screen can be degraded due to any noise coming from the outside.

SUMMARY

The present inventive concept has been made in an effort to provide a touch screen panel capable of minimizing influence of noise.

The present inventive concept has been made in another effort to provide a driving method of such a panel.

According to an exemplary embodiment of the present inventive concept, a touch screen panel may include: a touch sensor that outputs sensing data through n output channels ("n" is a natural number equal to or larger than 2); a noise measuring unit that calculates a noise value of an m-th output channel ("m" is a natural number smaller than "n") and a noise value of an m+1-th output channel by using the sensing data outputted from the touch sensor during a predetermined period; and a noise eliminating unit that produces noise eliminated data of the m+1-th output channel by using sensing data of the m-th output channel, sensing data of the m+1-th output channel, the noise value of the m-th output channel, and the noise value of the m+1-th output channel.

In this embodiment, the noise eliminating unit may include: a first calculation unit that calculates a noise ratio of the m-th output channel and the m+1-th output channel by using the noise value of the m-th output channel and the noise value of the m+1-th output channel; a second calculation unit 320 that produces intermediate data by deducting a value obtained by multiplying the sensing data of the m+1-th output channel by an antecedent of the noise ratio from a value obtained by multiplying the sensing data of the m-th output channel by a consequent of the noise ratio; and a third calculation unit that produces noise eliminated data of the m+1-th output channel by deducting a value obtained by multiplying the intermediate data by a reciprocal number of the antecedent of the noise ratio from a value obtained by multiplying noise eliminated data of the m-th output channel by a rate of the noise value of the m+1-th output channel and the noise value of the m-th output channel.

In this embodiment, noise eliminated data of a first output channel may have a predetermined value.

In this embodiment, the noise eliminated data of a first output channel may be set as a constant value or an average value of the sensing data through the n output channels.

In this embodiment, the noise measuring unit may set a square root of sum of squares of a plurality of sensing data which are outputted from the m-th output channel during the predetermined period as the noise value of the m-th output channel. The noise measuring unit may also set a square root of sum of squares of a plurality of sensing data which are outputted from the m+1-th output channel during the predetermined period as the noise value of the m+1-th output channel.

In this embodiment, the touch sensor may include a plurality of sensing electrodes connected with the output channels and outputting the sensing data to the output channels.

In this embodiment, the touch sensor may be a capacitive touch sensor.

According to the exemplary embodiment of the present inventive concept, a driving method of a touch screen panel may include: a step of calculating a noise value of an m-th output channel and a noise value of an m+1-th output channel by using sensing data outputted from a touch sensor during a predetermined period; and a step of producing noise eliminated data of the m+1-th output channel by using sensing data of the m-th output channel, sensing data of the m+1-th output channel, the noise value of the m-th output channel, and the noise value of the m+1-th output channel.

In this method, the step of producing the noise eliminated data of the m+1-th output channel may Include: a step of calculating a noise ratio of the m-th output channel and the m+1-th output channel by using the noise value of the m-th output channel and the noise value of the m+1-th output channel; a step of producing intermediate data by deducting a value obtained by multiplying the sensing data of the m+1-th output channel by an antecedent of the noise ratio from a value obtained by multiplying the sensing data of the m-th output channel by a consequent of the noise ratio; and a step of producing noise eliminated data of the m+1-th output channel by deducting a value obtained by multiplying the intermediate data by a reciprocal number of the antecedent of the noise ratio from a value obtained by multiplying noise eliminated data of the m-th output channel by a rate of the noise value of the m+1-th output channel and the noise value of the m-th output channel.

In this method, noise eliminated data of a first output channel may have a predetermined value.

In this method, the noise eliminated data of a first output channel may be set as a constant value or an average value of sensing data through output channels.

In this method, the step of calculating the noise value of the m-th output channel and the noise value of the m+1-th output channel may set a square root of sum of squares of a plurality of sensing data which are outputted from the m-th output channel during the predetermined period as the noise value of the m-th output channel, while setting a square root of sum of squares of a plurality of sensing data which are outputted from the m+1-th output channel during the predetermined period as the noise value of the m+1-th output channel.

In this method, the touch sensor may include a plurality of sensing electrodes connected with the output channels and outputting the sensing data to the output channels.

In this method, the touch sensor may be a capacitive touch sensor.

The exemplary embodiment of the present inventive concept can minimize influence of the noise since the noise existing for the respective channels with the different amount is entirely eliminated regardless of its amount.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this inventive concept will be thorough and complete and will fully convey the scope of the example embodiments to those skilled in the art. In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
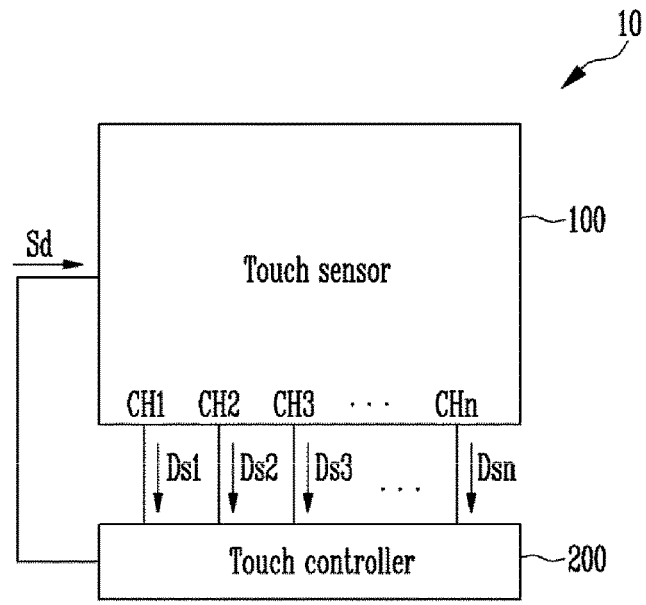
FIG. 1 is a view of a touch screen panel according to an exemplary embodiment of the present inventive concept.

The advantages and features of the present inventive concept and the methods for accomplishing the same will be apparent from the exemplary embodiments described hereinafter with reference to the accompanying drawings.

However, the present inventive concept is not limited to the exemplary embodiments described below and may be implemented in various ways, the exemplary embodiments are provided to complete the present inventive concept and make the scope of the present inventive concept clear to those skilled in the art, and the present inventive concept is defined only by the range described in claims. Like reference numerals indicate like constituent elements throughout the specification.

To clearly describe the present inventive concept, parts that are irrelevant to the description are omitted. Further, since sizes and thicknesses of constituent members shown in the accompanying drawings are arbitrarily given for better understanding and ease of description, the present inventive concept is not limited to the illustrated sizes and thicknesses.

In the drawings, the thickness of layers, regions, etc., are exaggerated for clarity. In the drawings, for understanding and ease of description, the thickness of some layers and areas is exaggerated. Further, throughout the present specification, it will be understood that when an element such as a layer, film, region, or substrate is referred to as being "on" another element, it can be directly on the other element or intervening elements may also be present.

Hereinafter, a touch screen panel and a driving method of the same according to the exemplary embodiments of the present inventive concept will be described with reference to the accompanying drawings.

Figure 2:
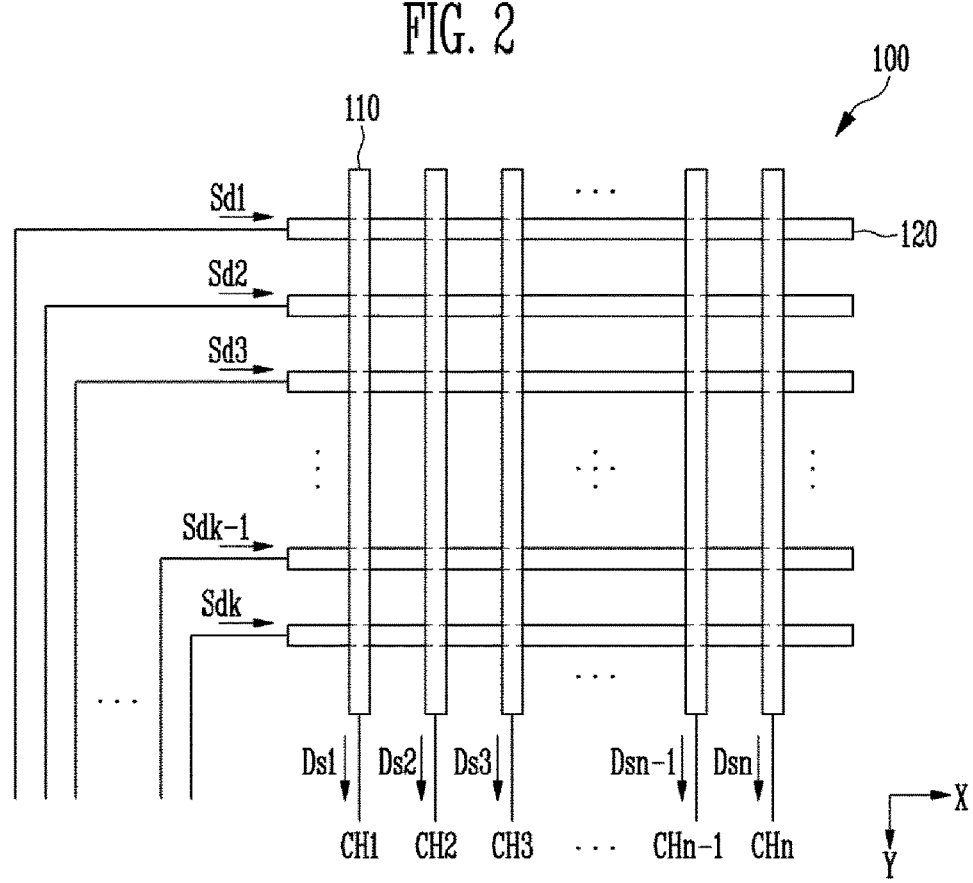
FIG. 2 is a view of a touch sensor according to the exemplary embodiment of the present inventive concept.

FIG. 1 is a view of a touch screen panel according to an exemplary embodiment of the present inventive concept, and FIG. 2 is a view of a touch sensor according to the exemplary embodiment of the present inventive concept.

Referring to FIG. 1, the touch screen panel 10 according to the exemplary embodiment of the present inventive concept includes a touch sensor 100 and a touch controller 200.

The touch sensor 100 may output sensing data Ds1 to Dsn corresponding to touch events generated at the touch screen panel 10.

The sensing data Ds1 to Dsn may vary depending on whether the touch event occurs or not and/or where the touch event occurs, The touch sensor 100 may output the sensing data Ds1 to Dsn through output channels CH1 to CHn ("n" is a natural number equal to or lager than 2).

The touch sensor 100 according to the exemplary embodiment of the present inventive concept may be a capacitive touch sensor.

Accordingly, when a touch event is occurred at a specific place in the touch sensor 100, capacitance of the place is changed and the sensing data of the output channel corresponding to the place is also changed.

For example, the touch sensor 100 according to the exemplary embodiment of the present inventive concept may be a mutual capacitive touch sensor.

Referring to FIG. 2, the touch sensor 100 may include a plurality of first sensing electrodes 110 and a plurality of second sensing electrodes 120.

The first sensing electrodes 110 are formed to extend to a first direction (y-axis direction), and are arranged in a second direction (X-axis direction) crossing the first direction.

For example, n first sensing electrodes 110 are illustrated in FIG. 2.

The second sensing electrodes 120 are formed to extend to the second direction (x-axis direction), and are arranged in the first direction (y-axis direction) crossing the second direction.

The second sensing electrodes 120 are arranged to be spaced apart from the first sensing electrodes 110 so that they may form a capacitance with the first sensing electrodes 110.

For example, the second sensing electrodes 120 may be arranged to intersect the first sensing electrodes 110. The second sensing electrodes 120 are placed below the first sensing electrodes 110 in FIG. 2, but they may be placed above the first sensing electrodes 110.

For example, k second sensing electrodes 120 are illustrated in FIG. 2.

At every intersection of the first and second sensing electrodes 110 and 120, mutual capacitance between the first and second sensing electrodes 110 and 120 are formed. In this case, each intersection may operate as a sensing cell that enables touch recognition of the device.

The first sensing electrodes 110 may output the sensing data Ds1 to Dsn reflecting variations in the mutual capacitance to the touch controller 200 through the output channels CH1 to CHn.

Preferably, the first and second sensing electrodes 110 and 120 are formed of a transparent conductive material, but an opaque conductive material such as metal may be also used.

For example, the first and second sensing electrodes 110 and 120 may be formed of indium tin oxide (ITO), indium zinc oxide (IZO), grapheme, carbon nanotube, silver nanowires (AgNWs), or the like.

The second sensing electrodes 120 may be supplied with driving signals Sd1 to Sdk from the touch controller 200.

Substantially, the touch sensor 200 may be a self-capacitive touch sensor.

In this case, some sensing electrodes (for example, the second sensing electrodes 120) may be omitted, and form and arrangement of the first sensing electrodes 110 may be modified.

However, if any noise occurs in the touch sensor 100 due to external environment, the sensing data Ds1 to Dsn outputted from the touch sensor 200 may be changed under the influence of the noise.

In this case, accuracy of the sensing data Ds1 to Dsn is decreased and touch sensing efficiency is also lowered.

Accordingly, the touch controller 200 according to the exemplary embodiment of the present inventive concept removes the noise from the sensing data Ds1 to Dsn of the touch sensor 100, thereby enabling accurate touch recognition.

Figure 3:
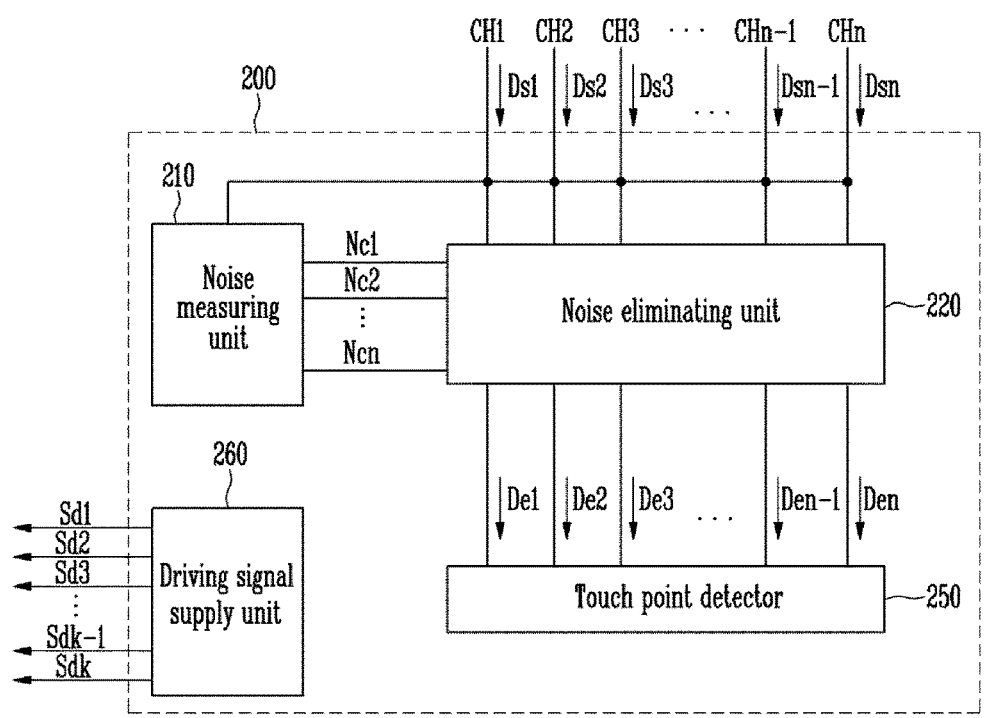
FIG. 3 is a view of a touch controller according to the exemplary embodiment of the present inventive concept.

FIG. 3 is a view of the touch controller according to the exemplary embodiment of the present inventive concept.

Referring to FIG. 3, the touch controller 200 according to the exemplary embodiment of the present inventive concept receives the sensing data Ds1 to Dsn from the touch sensor 100, and generates noise eliminated data De1 to Den from the received sensing data Ds1 to Dsn. In addition, the touch controller 200 may detect touch places through the noise eliminated data De1 to Den.

The touch controller 200 may include a noise measuring unit 210, a noise eliminating unit 220, and a touch point detector 250.

The noise measuring unit 210 may calculate noise values Nc1 to Ncn of the respective output channels CH1 to CHn by using the sensing data Ds1 to Dsn outputted from the touch sensor 100 during a predetermined period.

For example, the noise measuring unit 210 may calculate a noise value Ncm of an m-th output channel CHm ("m" is a natural number smaller than "n") and a noise value Ncm+1 of an m+1-th output channels CHm+1 by using sensing data Dsm and Dsm+1 outputted from the touch sensor 100 during the predetermined period.

In this case, the predetermined period is a duration in which the noise measuring unit 210 calculates the noise value, which will henceforth be referred as a noise measuring period. It is profitable that no touch event is generated during the noise measuring period.

The noise measuring unit 210 may set a square root of sum of squares of the respective sensing data Ds1 to Dsn which are outputted from the respective output channels CH1 to CHn during the noise measuring period as noise values Nc1 to Ncn of the respective output channels CH1 to CHn.

For example, the noise measuring unit 210 may set a square root of sum of squares of sensing data Dsm which are outputted from the m-th output channel CHm during the noise measuring period as a noise value Ncm of the m-th output channel CHm. In addition, the noise measuring unit 210 may set a square root of sum of squares of a plurality of sensing data Dsm+1 which are outputted from the m+1-th output channel CHm+1 during the noise measuring period as a noise value Ncm+1 of the m+1-th output channel CHm+1.

The noise eliminating unit 220 may produce the noise eliminated data De1 to Den of the respective output channels CH1 to CHn by using the sensing data Ds1 to Dsn and the noise values Nc1 to Ncn of the respective output channels CH1 to CHn.

For example, the noise eliminating unit 220 may produce the noise eliminated data Dem+1 of the m+1-th output channel CHm+1 by using the sensing data Dsm of the m-th output channel CHm, the sensing data Dsm+1 of the m+1-th output channel CHm+1, the noise value Ncm of the m-th output channel CHm, and the noise value Ncm+1 of the m+1-th output channel CHm+1.

In this case, the noise eliminated data De1 of the first output channel CH1 may have a predetermined value.

For example, the noise eliminated data De1 of the first output channel CH1 may be set as a constant such as "0" or as an average value of the sensing data Ds1 to Dsn.

The touch point detector 250 may detect a touch place by using the noise eliminated data De1 to Den produced by the noise eliminating unit 220.

For example, the touch point detector 250 compares the noise eliminated data De1 to Den with a predetermined reference value, and can detect the touch place when the corresponding condition is satisfied.

The noise eliminated data De1 to Den enable the touch place to be accurately detected since noise is completely eliminated from them.

The touch controller 200 according to the exemplary embodiment of the present inventive concept may further include a driving signal supply unit 260.

The driving signal supply unit 260 may supply driving signal Sd1 to Sdk to respective sensing electrodes (for example, the second sensing electrodes 120) included in the touch sensor 100.

For example, the driving signal supply unit 260 may sequentially supply the driving signal Sd1 to Sdk to the second sensing electrodes 120, or may simultaneously supply the driving signal Sd1 to Sdk to two or more second sensing electrodes 120.

Figure 4:
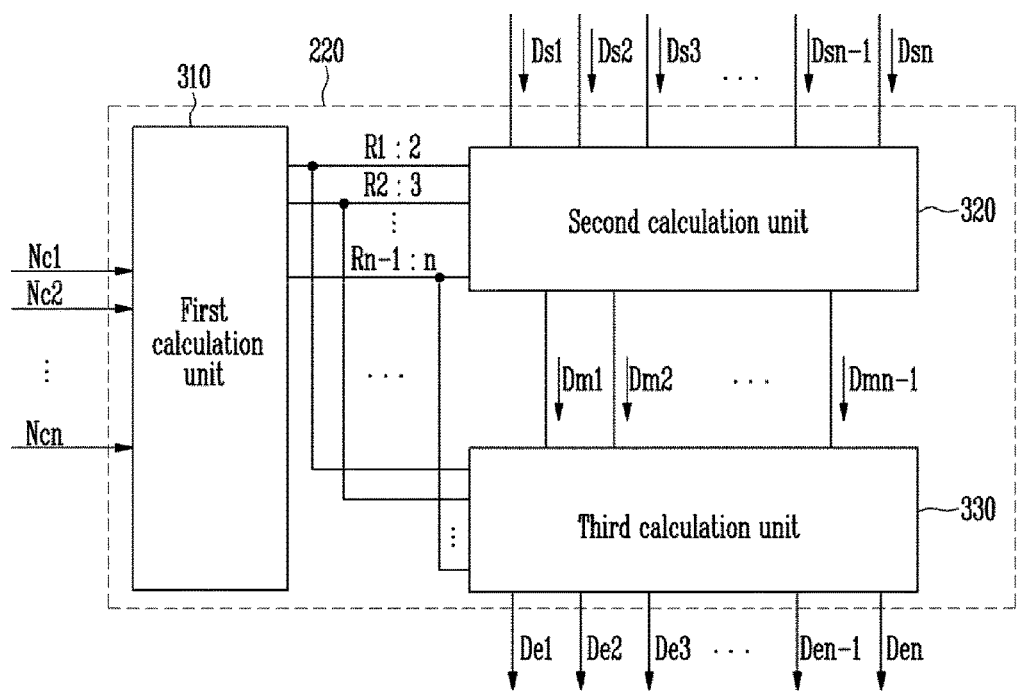
FIG. 4 is a view of a noise eliminating unit according to the exemplary embodiment of the present inventive concept.

FIG. 4 is a view of the noise eliminating unit according to the exemplary embodiment of the present inventive concept.

Referring to FIG. 4, the noise eliminating unit 220 according to the exemplary embodiment of the present inventive concept may include a first calculation unit 310, a second calculation unit 320, and a third calculation unit 330.

The first calculation unit 310 may calculate noise ratios R1:2 to Rn-1:n of two adjacent output channels by using the noise values of the two adjacent output channels among the output channels CH1 to CHn.

For example, the first calculation unit 310 may calculate a noise ratio Rm:m+1 of the m-th output channel CHm and the m+1-th output channel CHm+1 by using the noise value Ncm of the m-th output channel CHm and the noise value Ncm+1 of the m+1-th output channel CHm+1.

The second calculation unit 320 may produce intermediate data Dm1 to Dmm−1 by using the sensing data and the noise ratio of the two adjacent output channels among the output channels CH1 to CHn.

For example, intermediate data Dm may be obtained by deducting a value obtained by multiplying the sensing data Dsm+1 of the m+1-th output channel CHm+1 by an antecedent of the noise ratio Rm:m+1 from a value obtained by multiplying the sensing data Dsm of the m-th output channel CHm by a consequent of the noise ratio Rm:m+1.

The third calculation unit 330 may produce the noise eliminated data of a subsequent output channel of two adjacent output channels by using the noise values of the two adjacent output channels and the noise eliminated data of either of the two adjacent output channels.

For example, the third calculation unit 330 may produce the noise eliminated data Dem+1 of the m+1-th output channel CHm+1 by deducting a value obtained by multiplying the intermediate data Dm by a reciprocal number of the antecedent of the noise ratio Rm:m+1 from a value obtained by multiplying the noise eliminated data Dem of the m-th output channel CHm by a rate (Ncm+1/Ncm) of the noise value Ncm+1 of the m+1-th output channel CHm+1 and the noise value Ncm of the m-th output channel CHm.

In this case, since the noise eliminated data De1 of the first output channel CH1 have the predetermined value, the third calculation unit 330 can calculate the noise eliminated data De2 of the second output channel CH2 by using the noise eliminated data De1 of the first output channel CH1. The following noise eliminated data CH3 to CHn can be also sequentially calculated by the third calculation unit 330.

For ease of description, elements included in the touch controller 200 are illustrated as separate ones, but at least some of them may be integrated into an inseparable unit.

Figure 5:
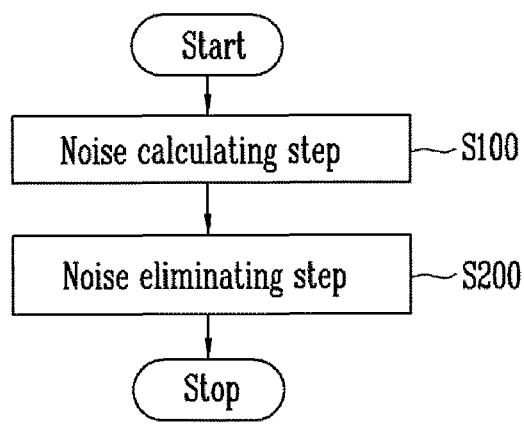
FIG. 5 is a flow chart showing a driving method of the touch screen panel according to the exemplary embodiment of the present inventive concept.

FIG. 5 is a flow chart showing a driving method of the touch screen panel according to the exemplary embodiment of the present inventive concept.

Referring to FIG. 5, the driving method of the touch screen panel according to the exemplary embodiment of the present inventive concept may include a step S100 for measuring noise and a step S200 for eliminating the noise.

At the noise measuring step S100, the noise value Ncm of the m-th output channel CHm and the noise value Ncm+1 of the m+1-th output channel CHm+1 are measured by using the sensing data Dsm and Dsm+1 outputted from the touch sensor 100 during the noise measuring period.

The noise measuring step S100 may be performed by the noise measuring unit 210.

For example, at the noise measuring step S100, a square root of sum of squares of a plurality of sensing data Dsm which are outputted from the m-th output channel CHm during a predetermined period may be set as the noise value Ncm of the m-th output channel CHm. In addition, a square root of sum of squares of a plurality of sensing data Dsm+1 which are outputted from the m+1-th output channel CHm+1 during the predetermined period may be set as the noise value Ncm+1 of the m+1-th output channel CHm+1.

For ease of description, it is assumed that only four output channels CH1 to CH4 exist. A method for calculating noise values of the respective output channels CH1 to CH4 is now described.

For example, the sensing data Ds1 to Ds4 outputted from the respective output channels CH1 to CH4 according to respective time points during a predetermined period (for example, the noise measuring period) are given in the following Table 1.

TABLE 1

|  | CH1 | CH2 | CH3 | CH4 |
|---|---|---|---|---|
| t1 | 5 | 10 | 15 | 20 |
| t2 | 4 | 8 | 12 | 16 |
| t3 | 3 | 6 | 9 | 12 |
| t4 | 2 | 4 | 6 | 8 |
| t5 | 1 | 2 | 3 | 4 |
| t6 | 0 | 0 | 0 | 0 |
| t7 | −1 | −2 | −3 | −4 |
| t8 | −2 | −4 | −6 | −8 |
| t9 | −3 | −6 | −9 | −12 |
| t10 | −4 | −8 | −12 | −16 |

In this case, the noise value Nc1 of the first output channel CH1 can be obtained by the following equation.

$$Nc1 = \sqrt{5^2 + 4^2 + 3^2 + 2^2 + 1^2 + 0^2 + (-1)^2 + (-2)^2 + (-3)^2 + (-4)^2}$$

Accordingly, a noise value Nc1 of the first output channel CH1 may be set as 9.22.

With the similar method, a noise value Nc2 of the second output channel CH2, a noise value Nc3 of the third output channel CH3, and a noise value Nc4 of the fourth output channel CH4 may be respectively set as 18.44, 27.66, and 36.88.

At the noise eliminating step S200, the noise eliminated data Dem+1 of the m+1-th output channel CHm+1 may be calculated by using the sensing data Dsm of the m-th output channel CHm, the sensing data Dsm+1 of the m+1-th output channel CHm, the noise value Ncm of the m-th output channel CHm, and the noise value Ncm+1 of the m+1-th output channel CHm+1.

In this case, the noise eliminated data De1 of the first output channel CH1 may have a predetermined value.

For example, the noise eliminated data De1 of the first output channel CH1 may be set as a constant such as "0" or as an average value of the sensing data Ds1 to Dsn.

Figure 6:
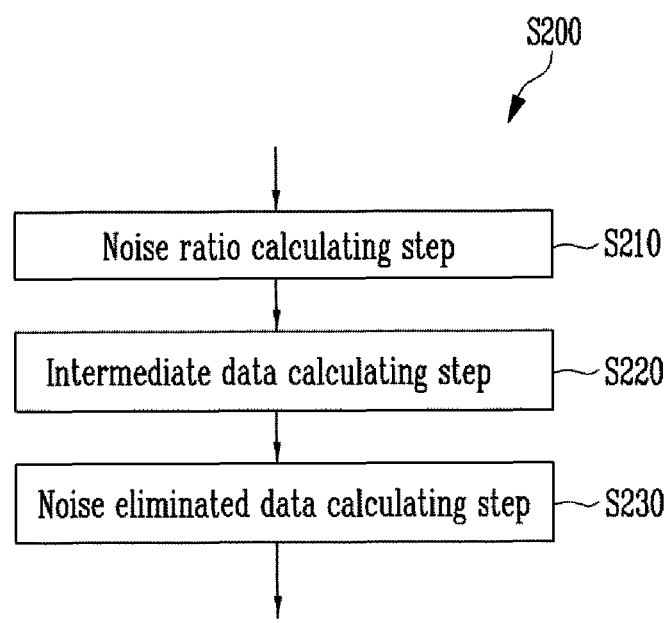
FIG. 6 is a flowchart showing a noise eliminating method in further detail than FIG. 5.

FIG. 6 is a flowchart showing a noise eliminating method in further detail than FIG. 5.

Referring to FIG. 6, the noise eliminating step S200 according to the exemplary embodiment of the present inventive concept may include a noise ratio calculating step S210, an intermediate data calculating step S220, and a noise eliminated data calculating step S230.

At the noise ratio calculating step S210, a noise ratio Rm:m+1 of the m-th output channel CHm and the m+1-th output channel CHm+1 may be calculated by using the noise value Ncm of the m-th output channel CHm and the noise value Ncm+1 of the m+1-th output channel CHm+1.

The noise ratio calculating step S210 may be performed by the first calculation unit 310 described before.

At the intermediate data calculating step S220, the intermediate data Dm corresponding to the m-th output channel CHm and the m+1-th output channel CHm+1 may be obtained by deducting a value obtained by multiplying the sensing data Dsm+1 of the m+1-th output channel CHm+1 by the antecedent of the noise ratio Rm:m+1 from a value obtained by multiplying the sensing data Dsm by the consequent of the noise ratio Rm:m+1.

The intermediate data calculating step S220 may be performed by the second calculation unit 320 described before.

At the noise eliminated data calculating step S230, the noise eliminated data Dem+1 of the m+1-th output channel CHm+1 may be obtained by deducting a value obtained by multiplying the intermediate data Dm by a reciprocal number of the antecedent of the noise ratio Rm:m+1 from a value obtained by multiplying the noise eliminated data Dem of the m-th output channel CHm by a rate (Ncm+1/Ncm) of the noise value Ncm+1 of the m+1-th output channel CHm+1 and the noise value Ncm of the m-th output channel CHm.

The noise eliminated data calculating step S230 may be performed by the third calculation unit 330 described before.

Figure 7:
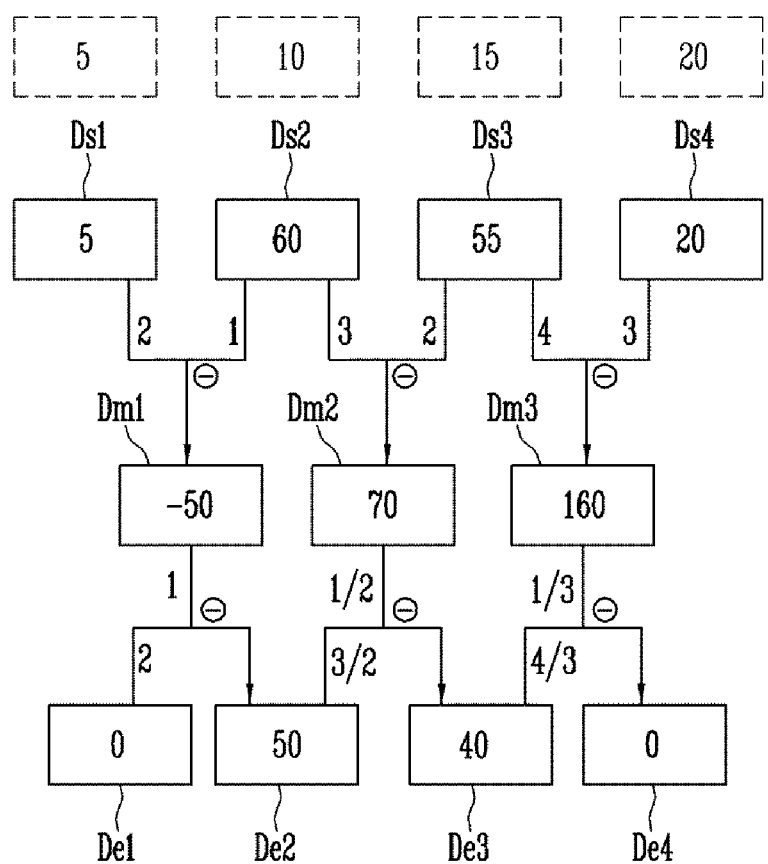
FIG. 7 is a view showing a process in which noise is eliminated by the noise eliminating method.

FIG. 7 is a view showing a process in which noise is eliminated by the noise eliminating method.

For ease of description, it is assumed that only four output channels CH1 to CH4 exist like in the case of the noise eliminating step S100, the process in which the noise is eliminated is now described.

The sensing data Ds1 to Ds4 outputted from the output channels CH1 to CH4 have values of 5, 60, 55, and 20, respectively.

In FIG. 7, the numbers in boxes outlined with a dotted line are the amount of noise included in the respective sensing data Ds1 to Ds4.

For example, it is assumed that the sensing data Ds1 of the first output channel CH1 includes the noise corresponding to "5", the sensing data Ds2 of the second output channel CH2 includes the noise corresponding to "10", the sensing data Ds3 of the third output channel CH3 includes the noise corresponding to "15", and the sensing data Ds4 of the fourth output channel CH4 includes the noise corresponding to "20".

At the noise ratio calculating step S210, the noise ratios R1:2, R2:3, and R3:4 of the two adjacent output channels (CH1 and H2, CH2 and CH3, and CH3 and CH4) may be obtained.

Since the noise value Nc1 of the first output channel CH1, the noise value Nc2 of the second output channel CH2, the noise value Nc3 of the third output channel CH3, and the noise value Nc4 of the fourth output channel CH4 are respectively 9.22, 18.44, 27.66, and 36.88 (which was obtained through the noise measuring step S100), the noise ratios R1:2, R2:3, and R3:4 can be obtained as in the following.

The noise value Nc1 of the first output channel CH1 is 9.22 and the noise value Nc2 of the second output channel CH2 is 18.44. Therefore, the noise ratio of the first output channel CH1 and the second output channel CH2 is 1:2.

Next, the noise value Nc2 of the second output channel CH2 is 18.44 and the noise value Nc3 of the third output channel CH3 is 27.66. Therefore, the noise ratio of the second output channel CH2 and the third output channel CH3 is 2:3.

Next, the noise value Nc3 of the third output channel CH3 is 27.66 and the noise value Nc4 of the fourth output channel CH4 is 36.88. Therefore, the noise ratio of the third output channel CH3 and the fourth output channel CH4 is 3:4.

The intermediate data Dm1 to Dm3, each corresponding to two adjacent output channels, may be obtained through the intermediate data calculating step S220.

In detail, a first intermediate data Dm1 corresponding to the first output channel CH1 and the second output channel CH2 may be obtained by deducting a value obtained by multiplying the sensing data D2 (60) of the second output channel CH2 and the antecedent (1) of the noise ratio R1:2 (1:2) from a value obtained by multiplying the sensing data Ds1 (5) and the consequent (2) of the noise ratio R1:2 (1:2). In this case, the first intermediate data Dm1 become −50.

Next, a second intermediate data Dm1 corresponding to the second output channel CH2 and the third output channel CH3 may be obtained by deducting a value obtained by multiplying the sensing data D3 (55) of the third output channel CH3 and the antecedent (2) of the noise ratio R2:3 (2:3) from a value obtained by multiplying the sensing data Ds2 (60) and the consequent (3) of the noise ratio R2:3 (2:3). In this case, the second intermediate data Dm2 become 70.

Next, a third intermediate data Dm3 corresponding to the third output channel CH3 and the fourth output channel CH4 may be obtained by deducting a value obtained by multiplying the sensing data D4 (20) of the fourth output channel CH4 and the antecedent (3) of the noise ratio R3:4 (3:4) from a value obtained by multiplying the sensing data Ds3 (55) and the consequent (4) of the noise ratio R3:4 (3:4). In this case, the third intermediate data Dm3 become 160.

The noise eliminated data De1 to De4 of the respective output channels CH1 to CH4 may be obtained through the noise eliminated data calculating step S230.

Firstly, the noise eliminated data De1 of the first output channel CH1 may be set as a predetermined constant, or an average value of the sensing data Ds1 to Ds4.

For ease of description, on the assumption that the noise eliminated data De1 of the first output channel CH1 is set as "0", the noise eliminated data calculating step S230 is now described.

The noise eliminated data De2 of the second output channel CH2 may be obtained by deducting a value obtained by multiplying the first intermediate data Dm1 (−50) by the reciprocal number (1) of the antecedent (1) of the noise ratio R1:2 (1:2) from a value obtained by multiplying the noise eliminated data De1 (0) of the first output channel CH1 by the rate (2) of the noise value Nc2 (18.44) of the second output channel CH2 and the noise value Nc1 (9.22) of the first output channel CH1. In this case, the noise eliminated data De2 of the second output channel CH2 become 50.

Next, the noise eliminated data De3 of the third output channel CH3 may be obtained by deducting a value obtained by multiplying the second intermediate data Dm2 (70) and the reciprocal number (½) of the antecedent (2) of the noise ratio R2:3 (2:3) from a value obtained by multiplying the noise eliminated data De2 (50) of the second output channel CH2 by the rate (3/2) of the noise value Nc3 (22.66) of the third output channel CH3 and the noise value Nc2 (18.44) of the second output channel CH2. In this case, the noise eliminated data De3 of the third output channel CH3 become 40.

Next, the noise eliminated data De4 of the fourth output channel CH4 may be obtained by deducting a value obtained by multiplying the third intermediate data Dm3 (160) and the reciprocal number (⅓) of the antecedent (3) of the noise ratio R3:4 (3:4) from a value obtained by multiplying the noise eliminated data De3 (40) of the third output channel CH3 by the rate (4/3) of the noise value Nc4 (36.88) of the fourth output channel CH4 and the noise value Nc3 (27.66) of the third output channel CH3. In this case, the noise eliminated data De4 of the fourth output channel CH4 become 0.

As described above, the respective noise eliminated data De1 to De4 may have values of 0, 50, 40, and 0.

Here, it can be seen that the noise eliminated data De1 to De4 of the output channels CH1 to CH4 are equal to values obtained by eliminating the amount of noise (5, 10, 15, and 20) from the initial sensing data Ds1 to Ds4.

Particularly, even the respective output channels have different noise values, the noise can be entirely eliminated regardless of its amount.

That is, the exemplary embodiment of the present inventive concept can minimize influence of the noise since the noise existing for the respective channels with the different amount is entirely eliminated regardless of its amount.

Example embodiments have been disclosed herein and although specific terms are employed, they are used and are to be interpreted in a generic and descriptive sense only and not for purpose of limitation. In some examples, as would be apparent to one of ordinary skill in the art as of the filing of the present application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the present inventive concept as set forth in the following claims.

What is claimed is:

1. A touch screen panel comprising:
   a touch sensor that outputs sensing data through n output channels respectively connected to n sensing electrodes, the n sensing electrodes extend substantially parallel to one another ("n" is a natural number equal to or larger than 2);
   a noise calculator that calculates a noise value of an m-th output channel ("m" is a natural number smaller than "n") and a noise value of an m+1-th output channel by using the sensing data outputted from the touch sensor during a predetermined period; and
   a noise eliminator that produces noise eliminated data of the m+1-th output channel by using sensing data of the m-th output channel, sensing data of the m+1-th output channel, the noise value of the m-th output channel, and the noise value of the m+1-th output channel,
   wherein the noise eliminator includes:
   a first calculator that calculates a noise ratio of the m-th output channel and the m+1-th output channel by using the noise value of the m-th output channel and the noise value of the m+1-th output channel;
   a second calculator that produces intermediate data by deducting a value obtained by multiplying the sensing data of the m+1-th output channel by an antecedent of the noise ratio from a value obtained by multiplying the sensing data of the m-th output channel by a consequent of the noise ratio; and
   a third calculator that produces noise eliminated data of the m+1-th output channel by deducting a value obtained by multiplying the intermediate data by a reciprocal number of the antecedent of the noise ratio from a value obtained by multiplying noise eliminated data of the m-th output channel by a rate of the noise value of the m+1-th output channel and the noise value of the m-th output channel.

2. The touch screen panel of claim 1, wherein noise eliminated data of a first output channel have a predetermined value.

3. The touch screen panel of claim 2, wherein the noise eliminated data of a first output channel is set as a constant value or an average value of the sensing data through the n output channels.

4. The touch screen panel of claim 1, wherein the noise calculator sets a square root of sum of squares of a plurality of sensing data which are outputted from the m-th output channel during the predetermined period as the noise value of the m-th output channel, while setting a square root of sum of squares of a plurality of sensing data which are outputted from the m+1-th output channel during the predetermined period as the noise value of the m+1-th output channel.

5. The touch screen panel of claim 4, wherein noise eliminated data of a first output channel has a predetermined value.

6. The touch screen panel of claim 1, wherein the touch sensor includes a plurality of sensing electrodes connected with the output channels and outputting the sensing data to the output channels.

7. The touch screen panel of claim 1, wherein the touch sensor is a capacitive touch sensor.

8. A driving method of a touch screen panel, which comprising:
   calculating a noise value of an m-th output channel connected to m-th sensing electrode and a noise value of an m+1-th output channel connected to m+1-th sensing electrode using a noise calculator, the noise calculator by using sensing data outputted from a touch sensor during a predetermined period to calculate the noise value of the m-th output channel and the m+1-th output channel, wherein the m-th sensing electrode and the m+1-th sensing electrode extends substantially parallel to each other; and
   producing noise eliminated data of the m+1-th output channel using a noise eliminator connected to the m-th output channel and the m+1-th output channel, the noise eliminator using sensing data of the m-th output channel, sensing data of the m+1-th output channel, the noise value of the m-th output channel, and the noise value of the m+1-th output channel to produce noise eliminated data of the m+1-th output channel,
   wherein the producing the noise eliminated data of the m+1-th output channel includes:
   calculating a noise ratio of the m-th output channel and the m+1-th output channel by using the noise value of the m-th output channel and the noise value of the m+1-th output channel;
   producing intermediate data by deducting a value obtained by multiplying the sensing data of the m+1-th output channel by an antecedent of the noise ratio from a value obtained by multiplying the sensing data of the m-th output channel by a consequent of the noise ratio; and
   producing noise eliminated data of the m+1-th output channel by deducting a value obtained by multiplying the intermediate data by a reciprocal number of the antecedent of the noise ratio from a value obtained by multiplying noise eliminated data of the m-th output channel by a rate of the noise value of the m+1-th output channel and the noise value of the m-th output channel.

9. The driving method of claim 8, wherein noise eliminated data of a first output channel have a predetermined value.

10. The touch screen panel of claim 9, wherein the noise eliminated data of a first output channel is set as a constant value or an average value of sensing data through output channels.

11. The driving method of claim 8, wherein the calculating the noise value of the m-th output channel and the noise value of the m+1-th output channel sets a square root of sum of squares of a plurality of sensing data which are outputted from the m-th output channel during the predetermined period as the noise value of the m-th output channel, while setting a square root of sum of squares of a plurality of sensing data which are outputted from the m+1-th output channel during the predetermined period as the noise value of the m+1-th output channel.

12. The driving method of claim 11, wherein noise eliminated data of a first output channel have a predetermined value.

13. The driving method of claim 8, wherein the touch sensor includes a plurality of sensing electrodes connected with the output channels and outputting the sensing data to the output channels.

14. The driving method of claim 8, wherein the touch sensor is a capacitive touch sensor.

* * * * *